(12) United States Patent
Tako et al.

(10) Patent No.: US 9,260,151 B2
(45) Date of Patent: Feb. 16, 2016

(54) REAR STRUCTURE OF SADDLE RIDING TYPE VEHICLE

(71) Applicant: HONDA MOTOR CO., LTD., Tokyo (JP)

(72) Inventors: Kenji Tako, Wako (JP); Akira Omae, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/068,111

(22) Filed: Oct. 31, 2013

(65) Prior Publication Data
US 2014/0167386 A1 Jun. 19, 2014

(30) Foreign Application Priority Data
Dec. 13, 2012 (JP) ................................. 2012-272365

(51) Int. Cl.
| | |
|---|---|
| *B62K 11/02* | (2006.01) |
| *B62J 1/28* | (2006.01) |
| *B62J 6/00* | (2006.01) |
| *B62J 6/04* | (2006.01) |

(52) U.S. Cl.
CPC . *B62K 11/02* (2013.01); *B62J 1/28* (2013.01); *B62J 6/005* (2013.01); *B62J 6/04* (2013.01)

(58) Field of Classification Search
CPC ............ B62K 11/02; B62J 1/28; B62J 6/005; B62J 6/04
USPC ........................................ 180/219; 280/304.5
See application file for complete search history.

(56) References Cited

U.S. PATENT DOCUMENTS

| | | | | |
|---|---|---|---|---|
| 4,099,645 | A | * | 7/1978 | Muth et al. ..................... 220/304 |
| 4,413,700 | A | * | 11/1983 | Shiratsuchi ................... 180/219 |
| 5,094,315 | A | * | 3/1992 | Taki et al. ...................... 180/219 |
| 6,588,529 | B2 | * | 7/2003 | Ishii et al. ...................... 180/219 |
| 7,134,706 | B2 | * | 11/2006 | Michisaka et al. .......... 296/97.22 |
| 7,322,725 | B2 | * | 1/2008 | Worakasemsuk et al. .... 362/473 |
| 7,401,959 | B2 | * | 7/2008 | Kogo et al. .................... 362/540 |
| 7,559,679 | B2 | * | 7/2009 | Isayama et al. ............... 362/522 |
| 7,588,356 | B2 | * | 9/2009 | Suita .............................. 362/473 |
| 7,651,112 | B2 | * | 1/2010 | Ozawa ........................ 280/304.5 |
| 7,798,509 | B2 | * | 9/2010 | Ohzono ..................... 280/152.05 |
| 7,857,341 | B2 | * | 12/2010 | Kobayashi et al. ......... 280/304.5 |
| D636,914 | S | * | 4/2011 | Ishiguri et al. ................. D26/28 |
| 2007/0205631 | A1 | * | 9/2007 | Nobuhira et al. ........... 296/181.1 |
| 2007/0230198 | A1 | * | 10/2007 | Ohzono ........................ 362/459 |
| 2008/0205073 | A1 | * | 8/2008 | Suita .............................. 362/473 |

FOREIGN PATENT DOCUMENTS

JP 2854594 B2 11/1998

* cited by examiner

*Primary Examiner* — Kevin Hurley
*Assistant Examiner* — Michael Stabley
(74) *Attorney, Agent, or Firm* — Birch, Stewart, Kolasch & Birch, LLP (57) ABSTRACT

A saddle riding type vehicle without a case body for surrounding rear direction indicators. A rear portion of a motorcycle includes a rear cowl covering sides of a vehicle body frame, a grab rail disposed on vehicle body sides of a rear occupant seat of a tandem seat above the rear cowl, a rear lamp assembly in the rear of the rear occupant seat and a rear mudguard under the rear lamp assembly. The grab rail includes a lower plate and an upper plate attached on the lower plate with the grab rail extending to a rear of the rear occupant seat. A left and a right of the grab rail are integrated with each other to wrap around the rear of the rear occupant seat. The grab rail has an opening portion opened to the rear with the rear lamp assembly being collectively housed in the opening portion.

10 Claims, 9 Drawing Sheets

EMBODIMENT

FIG. 10(a)

COMPARATIVE EXAMPLE

FIG. 10(b)

REAR STRUCTURE OF SADDLE RIDING TYPE VEHICLE

CROSS-REFERENCE TO RELATED APPLICATIONS

The present application claims priority under 35 USC 119 to Japanese Patent Application No. 2012-272365 filed Dec. 13, 2012 the entire contents of which are hereby incorporated by reference.

BACKGROUND OF THE INVENTION

1. Field of the Invention

The present invention relates to an improvement in a rear structure of a saddle riding type vehicle.

2. Description of Background Art

A rear structure of a saddle riding type vehicle is known wherein a left direction indicator and a right direction indicator surrounded by a reinforcing member are arranged on the sides of a seat on which an occupant is to be seated. See, for example, Japanese Patent No. 2854594.

As shown in FIG. 1 and FIG. 3 of Japanese Patent No. 2854594, a reinforcing member (13) (number in parentheses denotes a reference numeral described in Japanese Patent No. 2854594, and the same applies in the following) fixed to a vehicle body frame (2) is disposed between a seat (10) and a vehicle body cover (12), and a direction indicator (16) is disposed in a space between the reinforcing member (13) and the vehicle body cover (12).

The reinforcing member (13) (hereinafter referred to as a "grab rail") forming the rear portion of the vehicle in Japanese Patent No. 2854594 does not have a portion for covering the lower portion of the direction indicator (16). The direction indicator (16) therefore needs to be provided with a separate case body for surrounding the periphery of the direction indicator (16).

There is a desire for a rear structure of a saddle riding type vehicle wherein the structure of the case body for surrounding the direction indicator can be omitted.

SUMMARY AND OBJECTS OF THE INVENTION

It is an object of an embodiment of the present invention to provide a rear structure of a saddle riding type vehicle wherein the structure of a case body for surrounding a direction indicator can be omitted.

According to an embodiment of the present invention, there is provided a rear structure of a saddle riding type vehicle, the rear structure includes a vehicle body frame; a tandem seat mounted on the vehicle body frame, the tandem seat including a front occupant seat on which a driver is to be seated and a rear occupant seat on which a passenger is to be seated, the front occupant seat and the rear occupant seat being provided integrally with each other longitudinally; a rear cowl covering a side of the vehicle body frame; a grab rail disposed on vehicle body sides of the rear occupant seat of the tandem seat above the rear cowl and attached to the vehicle body frame, and grasped by a rear occupant during driving; a rear lamp assembly disposed in a rear of the tandem seat so as to face a rear of the vehicle, the rear lamp assembly including a tail lamp, a brake lamp, and direction indicators; and a rear mudguard disposed under the rear lamp assembly to prevent mud and water splashed up by a rear wheel from being splashed on a vehicle body. The grab rail includes a lower plate and an upper plate attached on the lower plate, the grab rail extends to a rear of the rear occupant seat, a left and a right of the grab rail are integrated with each other so as to wrap around the rear of the rear occupant seat, and the grab rail has an opening portion opened to the rear, and the rear lamp assembly is collectively housed in the opening portion.

According to an embodiment of the present invention, the lower plate has a vehicle body attachment portion attached to the vehicle body frame and a gripping portion extending from the vehicle body attachment portion to the rear so as to be able to be grasped by the passenger. The gripping portion has a gripping portion lower surface extending with a substantially constant width to a vicinity of the opening portion in a forward-rearward direction of the vehicle with a finger of the passenger being placed against the gripping portion lower surface when the passenger grips the gripping portion.

According to an embodiment of the present invention, a left and a right of the lower plate are separated from each other below the rear lamp assembly, and the rear mudguard is in contact with a lower surface of the rear lamp assembly.

According to an embodiment of the present invention, the upper plate and the lower plate project to an outside in a vehicle width direction, and the upper plate and the lower plate are coupled to each other. The direction indicators are arranged respectively at a left end portion and a right end portion of the rear lamp assembly.

According to an embodiment of the present invention, as viewed from a side of the vehicle, an end portion at which the lower plate faces the rear cowl extends substantially horizontally, and an end portion at which the upper plate faces the rear occupant seat extends from a front end of the lower plate to an obliquely rearward and upward position above the vehicle body attachment portion, and then extends substantially horizontally from a vicinity of a front end of the gripping portion to the rear.

According to an embodiment of the present invention, the gripping portion has a gripping portion vertical surface extending downward from an inner end portion in a vehicle width direction of the gripping portion lower surface in addition to the gripping portion lower surface. As viewed from a side of the vehicle, the gripping portion lower surface extends from a front portion of the lower plate to an obliquely rearward and upward position, and then extends to the rear substantially horizontally.

According to an embodiment of the present invention, a hole capable of being closed by a cap is made in the upper plate on an inside of the gripping portion vertical surface. An additional pipe extending out from the hole to a position above the upper plate to support a seat back is detachably attached to the vehicle body frame.

According to an embodiment of the present invention, the rear lamp assembly includes a lens portion. A central portion in a vehicle width direction of the lens portion projects to the rear of the vehicle as compared with a left end and a right end in the vehicle width direction of the lens portion.

According to an embodiment of the present invention, the rear lamp assembly is surrounded by the grab rail on the left side and the right side, surrounded by the grab rail that wraps around the rear of the rear occupant seat on the upper side, and surrounded by the rear mudguard on the lower side. The grab rail has the opening portion opened to the rear. The rear lamp assembly is collectively housed in the opening portion. More specifically, the grab rail can be used as a member serving also as a case body for the rear lamp assembly. Thus, the case body surrounding the rear lamp assembly can be omitted. When the case body for the rear lamp assembly can be omitted, the rear lamp assembly including the direction indicators can be reduced in cost.

According to an embodiment of the present invention, the gripping portion extends linearly from the front to the rear. The gripping portion thus extending linearly without changing in length in the vehicle width direction is easily grasped even blindly. In addition, as compared with a vehicle whose vehicle body rear portion is decreased in width, the present invention secures a large width for the vehicle body rear portion because the gripping portion extends linearly from the front to the rear. Because a large width of the rear lamp assembly is secured, the visibility of the rear lamp assembly can be enhanced.

According to an embodiment of the present invention, the left and right of the lower plate of the grab rail are separated from each other below the rear lamp assembly. As compared with a case where the left and right of the lower plate of the grab rail are integrated with each other, it is easier to omit unnecessary portions when the left and right of the lower plate of the grab rail are formed separately from each other. As a result, the grab rail can be reduced in weight.

In addition, the rear mudguard blocks mud splashed up by the rear wheel, thus eliminating a fear of the mud flying onto the rear lamp assembly. In addition, because the rear mudguard is in contact with the rear lamp assembly, the set position of the rear mudguard can be raised, and a swing space for the rear wheel can be enlarged.

According to an embodiment of the present invention, the upper plate and the lower plate are coupled to each other at portions where an outer surface of the grab rail changes sharply. Therefore joints of the upper plate and the lower plate can be made inconspicuous. In addition, the direction indicators are arranged in both of the left and right ends of the rear lamp assembly. In the case of the direction indicators arranged at both of the left end and the right end, an interval between the left and right direction indicators is increased. As a result, the visibility of the direction indicators can be enhanced.

According to an embodiment of the present invention, the lower plate extends substantially horizontally in the forward-rearward direction of the vehicle. When the gripping portion formed in the lower plate also extends substantially horizontally, the rear occupant can grasp the gripping portion at an arbitrary position in the forward-rearward direction of the vehicle. The ease of use of the grab rail is thus further enhanced.

In addition, the gripping portion of the grab rail extends from the attachment portion to an obliquely rearward and upward position to come closer to the passenger, and is thus grasped easily.

According to an embodiment of the present invention, as viewed from a side of the vehicle, the gripping portion lower surface extends from a front portion of the lower plate to an obliquely rearward and upward position. The gripping portion lower surface is formed in a similar shape to that of the upper end portion of the upper plate which upper end portion extends from the front end of the lower plate to an obliquely rearward and upward position. Therefore the external appearance characteristics of the grab rail can be improved.

According to an embodiment of the present invention, an additional pipe for supporting a seat back is detachably attached to the vehicle body frame. Members such as the seat back and the like can be attached or detached by merely attaching or removing the additional pipe without replacing the grab rail or without making new holes in the grab rail. As a result, diversification of specifications can be achieved without increasing types of parts.

According to an embodiment of the present invention, a central portion of the lens portion of the rear lamp assembly projects to the rear of the vehicle as compared with a left end and a right end of the lens portion of the rear lamp assembly. When the central portion projects rearward, excellent visibility is ensured even when the rear lamp assembly is viewed obliquely from the rear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described in detail. In the drawings and embodiments, "up," "down," "front," "rear," "left," and "right" represents respective directions as viewed from a driver riding a motorcycle.

An embodiment of the present invention will be described with reference to the drawings.

Figure 1:
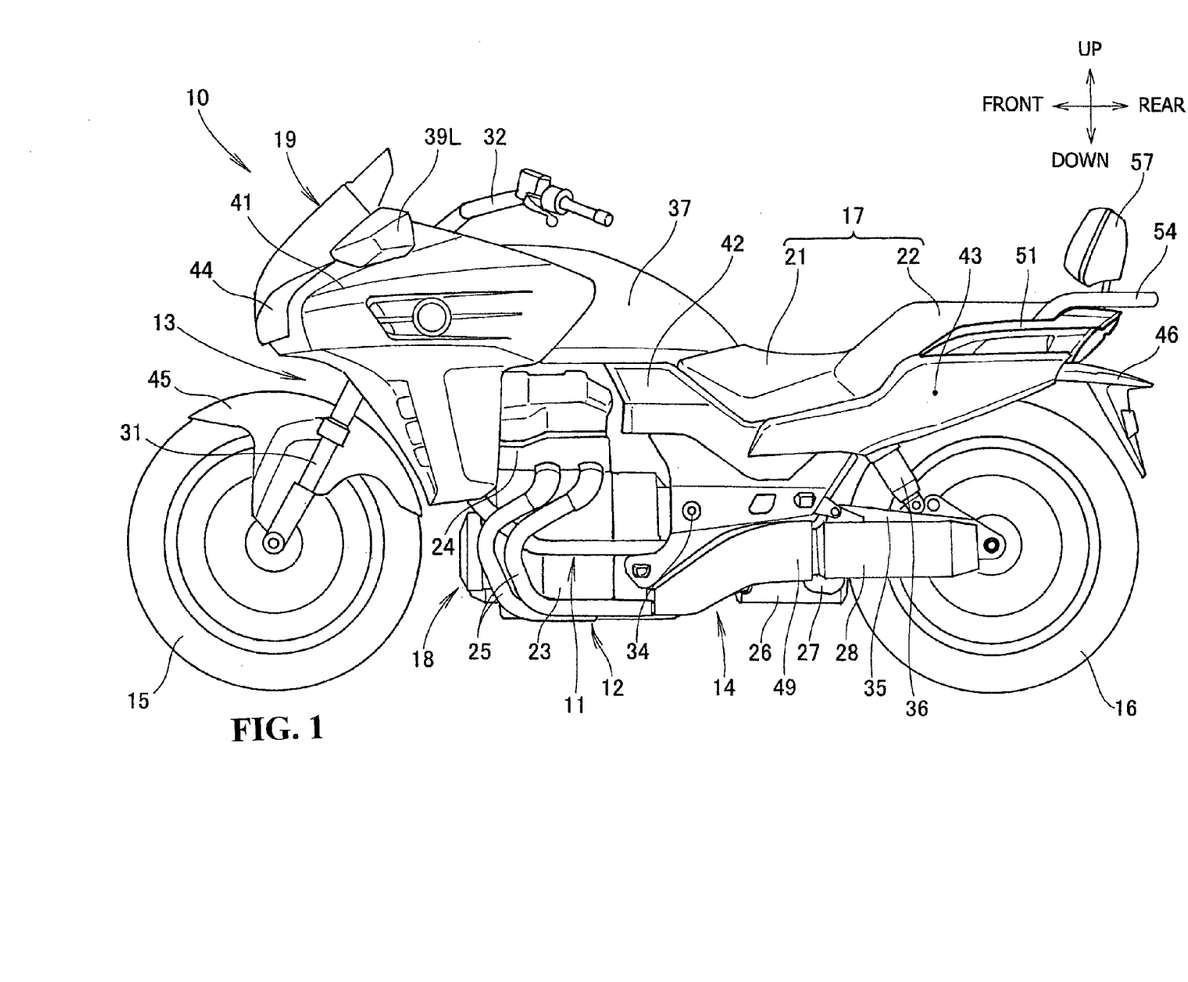
FIG. 1 is a left side view of a motorcycle according to the present invention.

As shown in FIG. 1, a motorcycle 10 includes a vehicle body frame 11, an engine 12 suspended from the vehicle body frame 11, a front wheel steering portion 13 that is provided in front of the engine 12 and which supports a front wheel 15, a rear wheel suspension portion 14 that is provided in the rear of the engine 12 and which swingably supports a rear wheel 16, a tandem seat 17 mounted on the vehicle body frame 11 between the front wheel 15 and the rear wheel 16, and a cowl 19 covering a vehicle body 18. The tandem seat 17 includes a front occupant seat 21 on which a driver is to be seated and a rear occupant seat 22 on which a passenger is to be seated, the front occupant seat 21 and the rear occupant seat 22 being provided integrally with each other longitudinally. The vehicle body 18 includes the vehicle body frame 11.

The engine 12 is a V-type four-cylinder engine having a crankcase 23 and a cylinder portion 24 attached on the crankcase 23, with a crankshaft not shown in the figures extending in the forward-rearward direction of the vehicle and with cylinders extending obliquely upwardly and outwardly in a vehicle width direction. Two exhaust pipes 25 extend from the side portions of the cylinder portion 24. These exhaust pipes 25 extend downwardly, change in direction to the rear, extend to the rear of the vehicle, and are coupled to a cylindrical catalyst unit 26 attached to the lower portion of the vehicle body frame 11. A connecting pipe 27 is extended from the catalyst unit 26 to the side of the vehicle. An end of the connecting pipe 27 is coupled to a muffler 28. The above description has been made of the exhaust system for the two cylinders on the left side which cylinders are disposed on the left side in the vehicle width direction as a foreground side in FIG. 1. An exhaust system for the two cylinders on the right side has a similar constitution, and thus description thereof will be omitted.

The front wheel steering portion 13 has a front fork 31 steerably supported by the front end of the vehicle body frame 11, the front wheel 15 rotatably attached to the lower ends of the front fork 31, and handlebars 32 attached to the upper end of the front fork 31 and operated for steering by the driver. The rear wheel suspension portion 14 has a pivot shaft 34 that is attached to a pivot frame not shown in the figures which pivot frame forms the vehicle body frame 11, and which pivot shaft 34 extends to the left and right in the vehicle width direction, a swing arm 35 extending to the rear of the vehicle from the pivot shaft 34, the rear wheel 16 rotatably provided to the rear end of the swing arm 35, and a shock absorber unit 36 stretched between the rear portion of the swing arm 35 and the vehicle body frame 11. A fuel tank 37 is disposed above the engine 12.

The cowl 19 includes a front cowl 41 covering the front portion of the vehicle and the sides of the front portion of the vehicle, a mid-cowl 42 covering the rear of the cylinder portion 24 under the fuel tank 37 and covering the front portions of the sides of the front occupant seat 21, and a rear cowl 43 extending to the rear of the vehicle so as to be continuous with the rear end of the mid cowl 42 and covering the rear portions of the sides of the front occupant seat 21 and the lower portion of the rear occupant seat 22. A headlight 44 is mounted on the front end of the front cowl 41. In addition, front direction indicators 39L and 39R (only the reference 39L on the foreground side of FIG. 1 is shown) are attached to the side portions of the front cowl 41. A front mudguard 45 is attached to the front fork 31 over the front wheel 15. An exhaust pipe cover 49 covers a portion between the exhaust pipes 25 and the muffler 28. The exhaust pipe cover 49 is provided to improve the external appearance characteristics of the vehicle. The rear structure of the vehicle will be described with reference to FIG. 2 and subsequent drawings.

Figure 2:
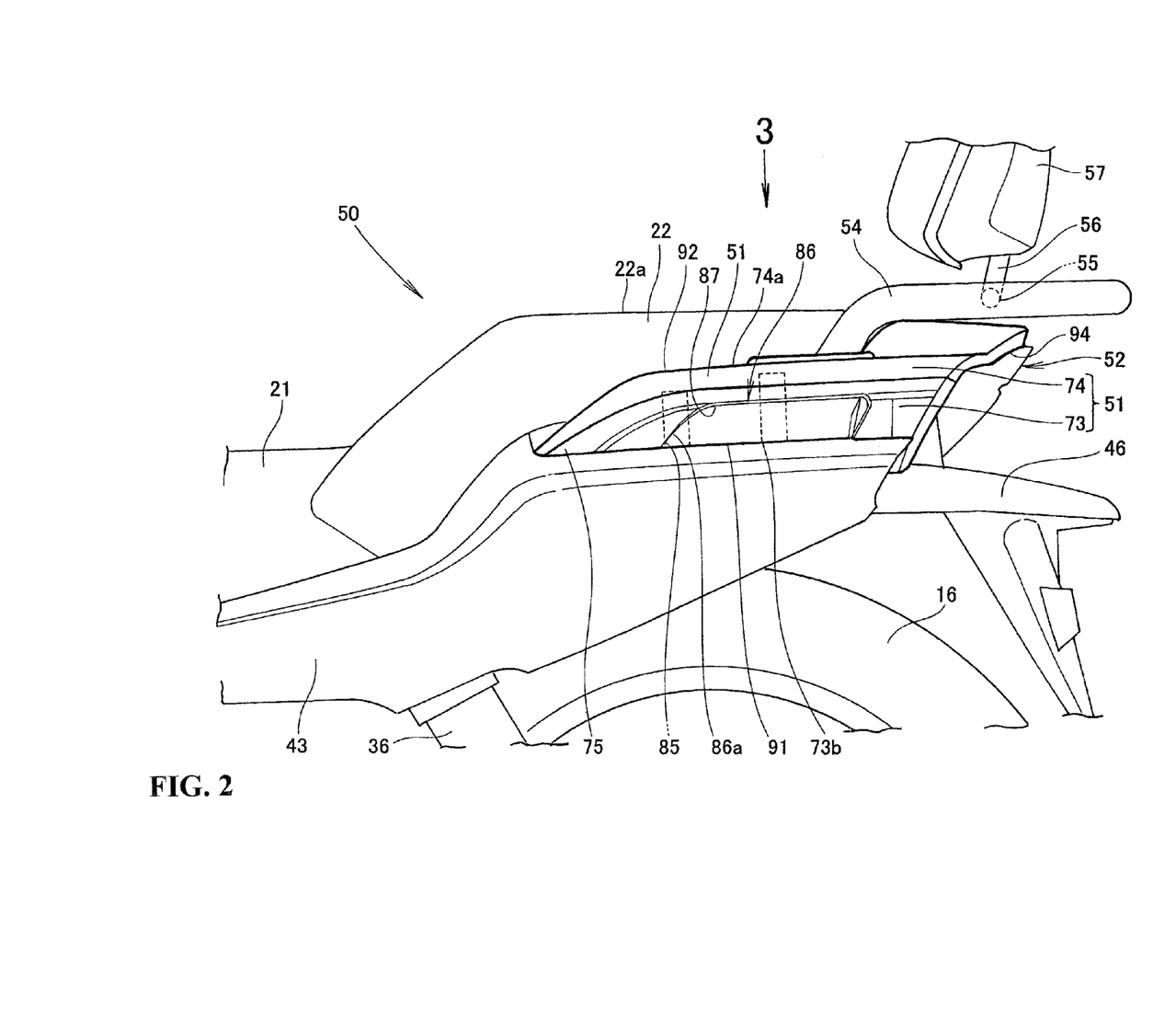
FIG. 2 is a fragmentary enlarged view of FIG. 1.

As shown in FIG. 2, a vehicle rear portion 50 includes the rear cowl 43 covering the sides of the vehicle body frame 11, a grab rail 51 disposed on the vehicle body sides of the rear occupant seat 22 above the rear cowl 43 and grabbed by a rear occupant during driving, a rear lamp assembly 52 (referred to also as a "rear combination lamp unit") that is disposed in the rear of the tandem seat 17 so as to face the rear of the vehicle and which rear lamp assembly 52 collectively houses a plurality of kinds of lamps, and a rear mudguard 46 disposed under the rear lamp assembly 52 to prevent mud and water splashed up by the rear wheel 16 from being splashed on the vehicle body.

Figure 3:
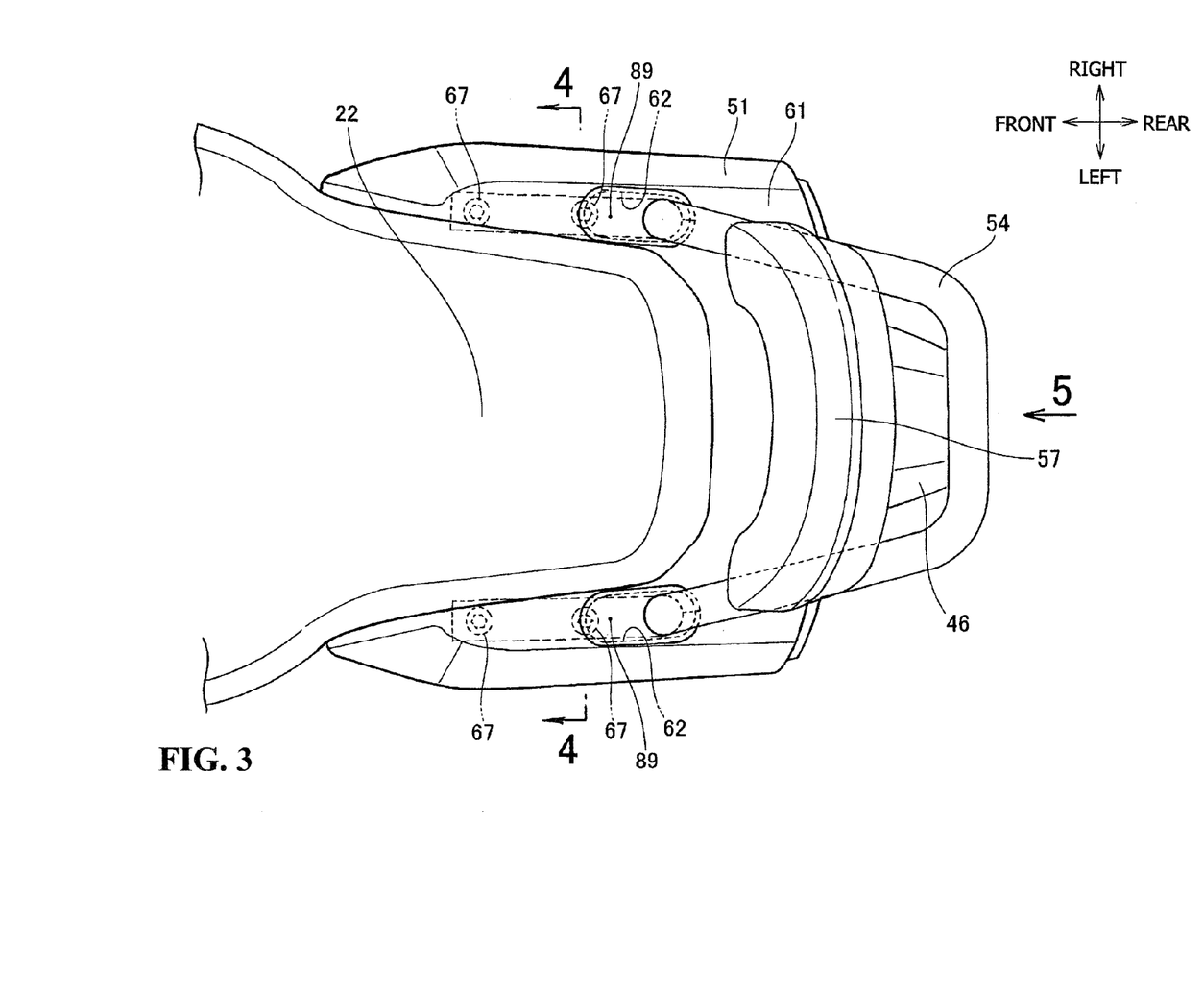
FIG. 3 is a view taken in the direction of an arrow 3 in FIG. 2.

An additional pipe 54 extends from the grab rail 51. The additional pipe 54 extends obliquely rearwardly and upwardly, and then extends substantially horizontally to the rear of the vehicle. As shown in FIG. 3, the additional pipe 54 has substantially the shape of a letter U opened to the front side of the vehicle. A sub-cross member 55 is stretched in the vehicle width direction across the additional pipe 54 in substantially the shape of a letter U. A vertical arm 56 projects upwardly from the sub-cross member 55. A seat back 57 is attached to the upper end of the vertical arm 56. More specifically, the seat back 57 is supported by the additional pipe 54. The seat back 57 is a back on which the passenger seated on the rear occupant seat 22 can engage the back of the passenger.

As shown in FIG. 3, the grab rail 51 is a member that extends to the rear of the rear occupant seat 22 and whose left and right are integrated with each other so as to wrap around the rear of the rear occupant seat 22. As viewed from above, the grab rail 51 surrounds the left and right sides and the rear of the rear occupant seat 22 and covers the upper portion of the rear portion of the vehicle.

Holes 62 are made in an upper surface 61 of the grab rail 51. The additional pipe 54 extends out from these holes 62 to a position above the grab rail 51. The additional pipe 54 is attached to the vehicle body frame 11 as shown in FIG. 4 to be described later.

The structure of the grab rail and peripheral portions thereof will be described next.

Figure 4:
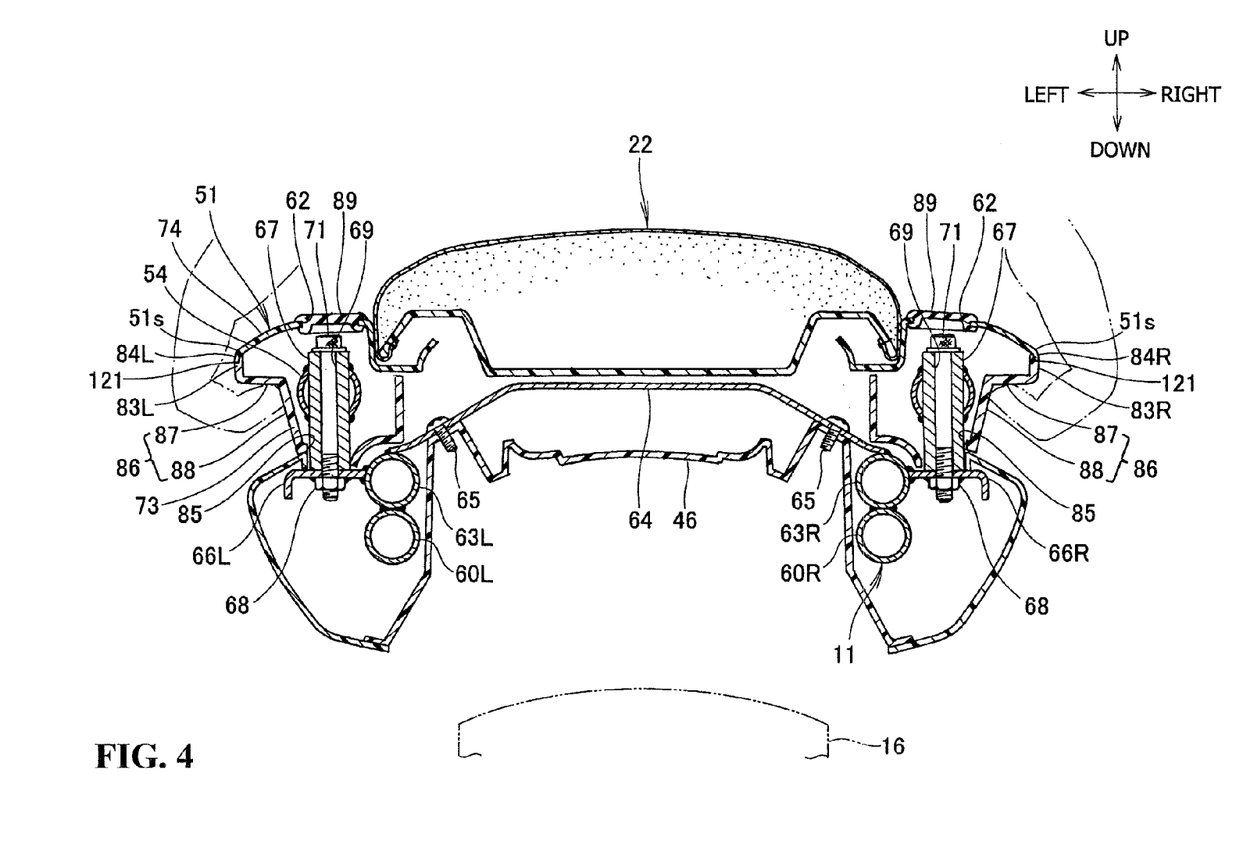
FIG. 4 is a sectional view taken along a line 4-4 of FIG. 3.

As shown in FIG. 4, a cross member 64 is stretched between a left seat rail 63L and a right seat rail 63R that form the vehicle body frame 11 and on which the tandem seat 17 is mounted. The rear mudguard 46 for protection from mud splashed by the rear wheel 16 is attached to the lower surface of the cross member 64 via two screws 65. Plate-shaped stays 66L and 66R horizontally extend respectively from the left and right seat rails 63L and 63R to the outside of the vehicle. Column-shaped mount members 67 are mounted respectively on the upper surfaces of the stays 66L and 66R. The additional pipe 54 is fastened to and integrated with the mount members 67 in advance. Horizontally extending portions of the additional pipe 54 are fastened to the mount members 67. In the present embodiment, the mount members 67 to which the additional pipe 54 is fastened are attached respectively to the stays 66L and 66R. However, it is also possible to attach the mount members 67 to which the additional pipe 54 is not fastened. Thereby provisions can be made also for specifications without the additional pipe 54.

Describing an attachment structure for the mount members 67 with which the additional pipe 54 is integrated, weld nuts 68 are welded to the lower surfaces of the stays 66L and 66R, bolt holes 69 made in the mount members 67 are aligned with the weld nuts 68, and bolts 71 are passed from above through the mount members 67, whereby the additional pipe 54 is attached to the vehicle body frame 11 via the mount members 67.

The grab rail 51 is also attached to the mount members 67. The grab rail 51 includes a lower plate 73 and an upper plate 74 attached on the lower plate 73. The upper plate 74 and the lower plate 73 project to the outside in the vehicle width direction. The lower plate 73 and the upper plate 74 are coupled to each other at respective outer end portions 83L and 84L and 83R and 84R. The lower plate 73 has a plurality of vehicle body attachment portions 85 attached so as to be fitted to the mount members 67 included in the vehicle body frame 11. These vehicle body attachment portions 85 are attached to the mount members 67. More specifically, the grab rail 51 is attached to the vehicle body frame 11 via the mount members 67.

The grab rail 51 has gripping portions 86 that can be grasped by the passenger. The gripping portions 86 have gripping portion lower surfaces 87 and gripping portion vertical surfaces 88 extending downward from inner end portions in the vehicle width direction of the gripping portion lower surfaces 87.

The holes 62 that are made in the upper plate 74 and through which the additional pipe 54 is passed are made on the inside of the gripping portion vertical surfaces 88. The holes 62 can be closed by caps 89. The additional pipe 54 is fastened to and integral with the mount members 67 in advance as described above, and thus detachably attached to the vehicle body frame 11. In addition, support frames 60L and 60R are arranged under the left and right seat rails 63L and 63R, respectively.

The external appearance of the grab rail 51 will next be described.

In FIG. 2, the gripping portion 86 extends from the vehicle body attachment portion 85 to the rear. As viewed from the side of the vehicle, the gripping portion lower surface 87 on which the fingers of the passenger are placed extends from the front portion of the lower plate 73 to an obliquely rearward and upward position, and then extends rearwardly substantially horizontally. An end portion 91 at which the lower plate 73 faces the rear cowl 43 extends substantially horizontally. An end portion 92 at which the upper plate 74 faces the rear occupant seat 22 extends from a front end 75 of the lower plate 73 to an obliquely rearward and upward position above the vehicle body attachment portion, and then extends substantially horizontally from the vicinity of a front end 86a of the gripping portion 86 to the rear.

The rear lamp assembly 52 as viewed from the rear of the vehicle will be described with reference to FIGS. 5 to 6.

Figure 5:
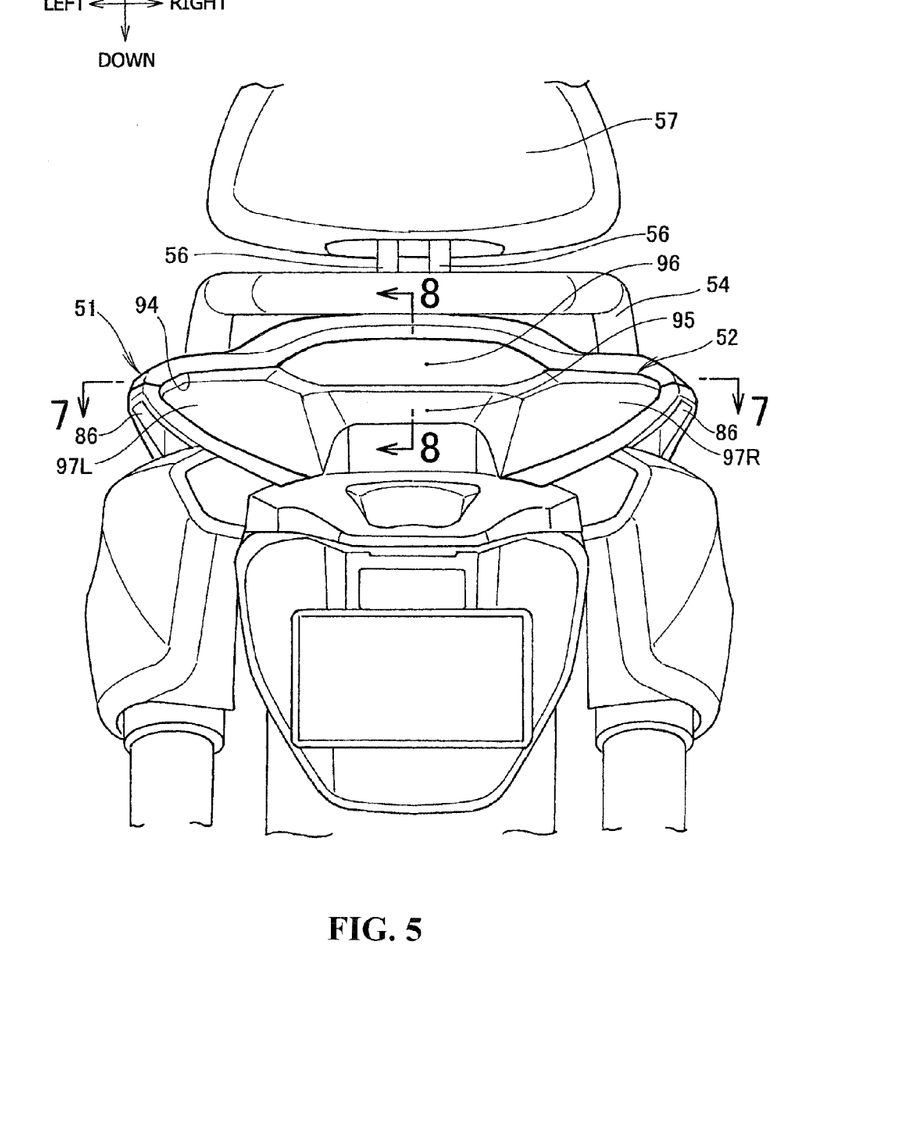
FIG. 5 is a view taken in the direction of an arrow 5 in FIG. 3.

As shown in FIG. 5, the grab rail 51 is provided to the rear portion of the vehicle. The grab rail 51 has an opening portion 94 opened to the rear. The rear lamp assembly 52 is collectively housed in the opening portion 94. The rear lamp assembly 52 includes tail lamps 95, brake lamps 96, and direction indicators 97L and 97R. The arrangement structure of the tail lamps 95, the brake lamps 96, and the direction indicators 97L and 97R will be described with reference to FIG. 6.

Figure 6:
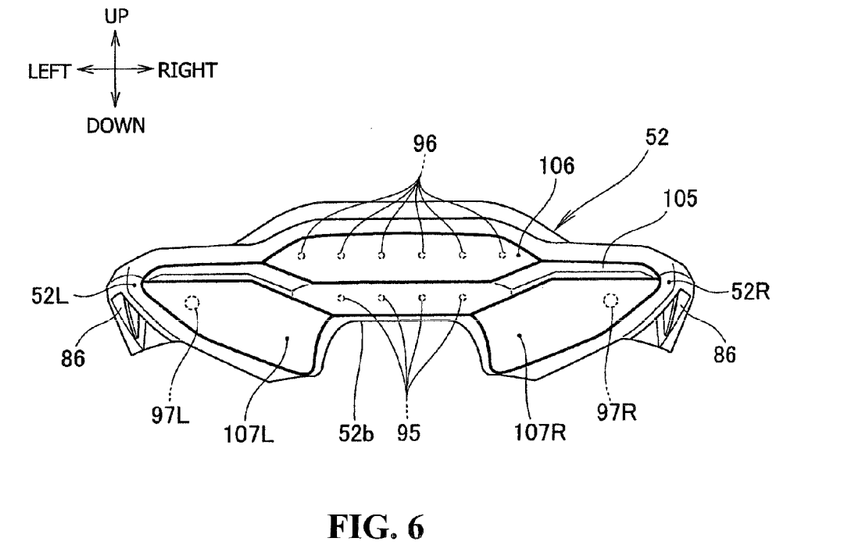
FIG. 6 is a diagram of assistance in explaining the arrangement of tail lamps, brake lamps, and direction indicators.

As shown in FIG. 6, the rear lamp assembly 52 is divided into a brake lamp zone 106 extending from the center in the vehicle width direction to the left and right in the vehicle width direction. A tail lamp zone 105 is disposed below the brake lamp zone 106 and extends thinly to the left and the right in the vehicle width direction in substantially the center in a height direction. The left direction indicator zone 107L and the right direction indicator zone 107R are disposed below the tail lamp zone 105 so as to be separated to the left and the right in the vehicle width direction.

The left and right direction indicators 97L and 97R are arranged respectively in the left and right direction indicator zones 107L and 107R. A plurality of the tail lamps 95 are arranged in the tail lamp zone 105. A plurality of the brake lamps 96 are arranged in the brake lamp zone 106. The direction indicators 97L and 97R are arranged respectively in the left and right end portions 52L and 52R of the rear lamp assembly 52. In the case of the direction indicators 97L and 97R arranged at both of the left end and the right end, an interval between the left and right direction indicators 97L and 97R is increased. As a result, the visibility of the direction indicators 97L and 97R can be enhanced. Referring also to FIG. 4, the rear mudguard 46 is in contact with a lower surface 52b of the rear lamp assembly 52.

The structure of the rear lamp assembly 52 will next be described.

Figure 7:
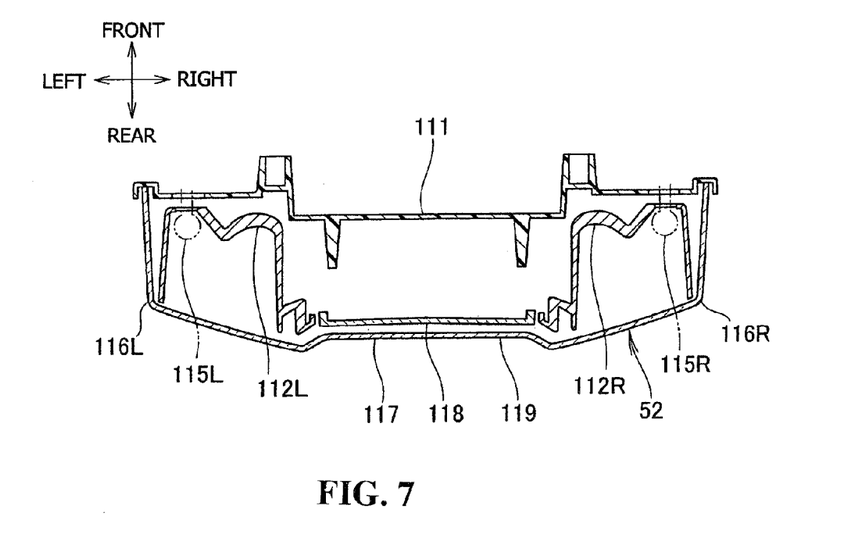
FIG. 7 is a sectional view taken along a line 7-7 of FIG. 5.

As shown in FIG. 7, the rear lamp assembly 52 has a base portion 111 attached to the side of the vehicle body frame (reference numeral 11 in FIG. 4), a left first reflector 112L and a right first reflector 112R and a left light emitter 115L and a right light emitter 115R supported by the base portion 111. An inner lens 118 is disposed between the left and right first reflectors 112L and 112R with a lens portion 119 collectively covering the left and right first reflectors 112L and 112R, the left and right light emitters 115L and 115R, and the inner lens 118. The left and right light emitters 115L and 115R function as the direction indicators 97L and 97R. The grab rail is omitted in FIG. 7.

Figure 8:
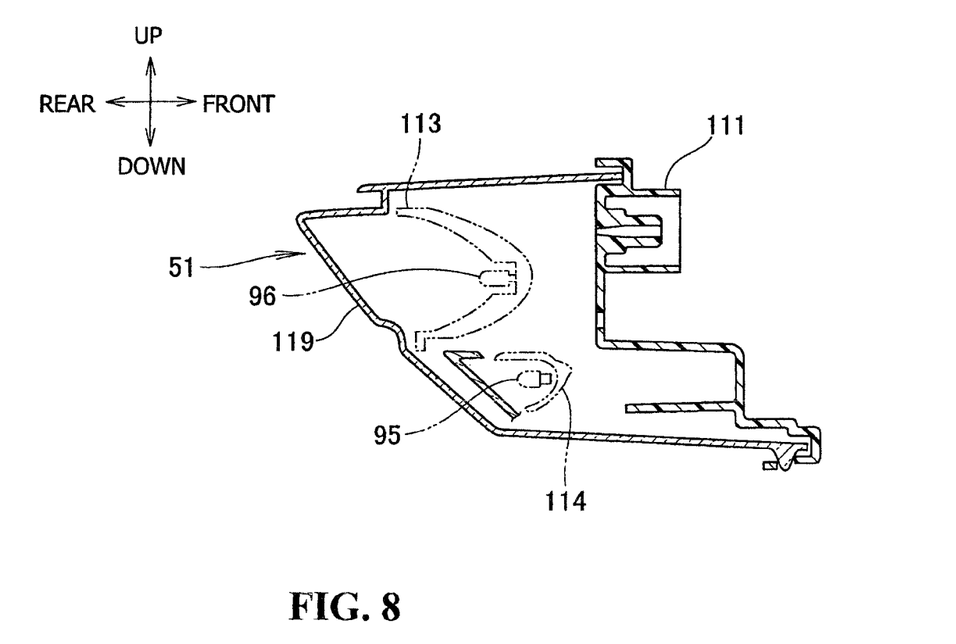
FIG. 8 is a sectional view taken along a line 8-8 of FIG. 5.

As shown in FIG. 8, the base portion 111 supports a second reflector 113 and a third reflector 114 disposed below the second reflector 113 in the center in the vehicle width direction of the rear lamp assembly 52 and in the upper portion in the height direction of the rear lamp assembly 52. The second reflector 113 and the third reflector 114 are collectively covered by the lens portion 119.

Referring also to FIG. 7, the rear lamp assembly 52 includes the lens portion 119. A central portion 117 in the vehicle width direction of the lens portion 119 projects to the rear of the vehicle as compared with a left end 116L and a right end 116R in the vehicle width direction of the lens portion 119. When the central portion 117 projects rearward, the brake lamps 96 arranged in the upper portion in the height direction of the central portion 117, for example, are easily seen even when the rear lamp assembly 52 is viewed obliquely from the rear. As a result, excellent visibility of the brake lamps 96 is ensured.

The action of the rear structure of the motorcycle described above will be described next.

Figure 9:
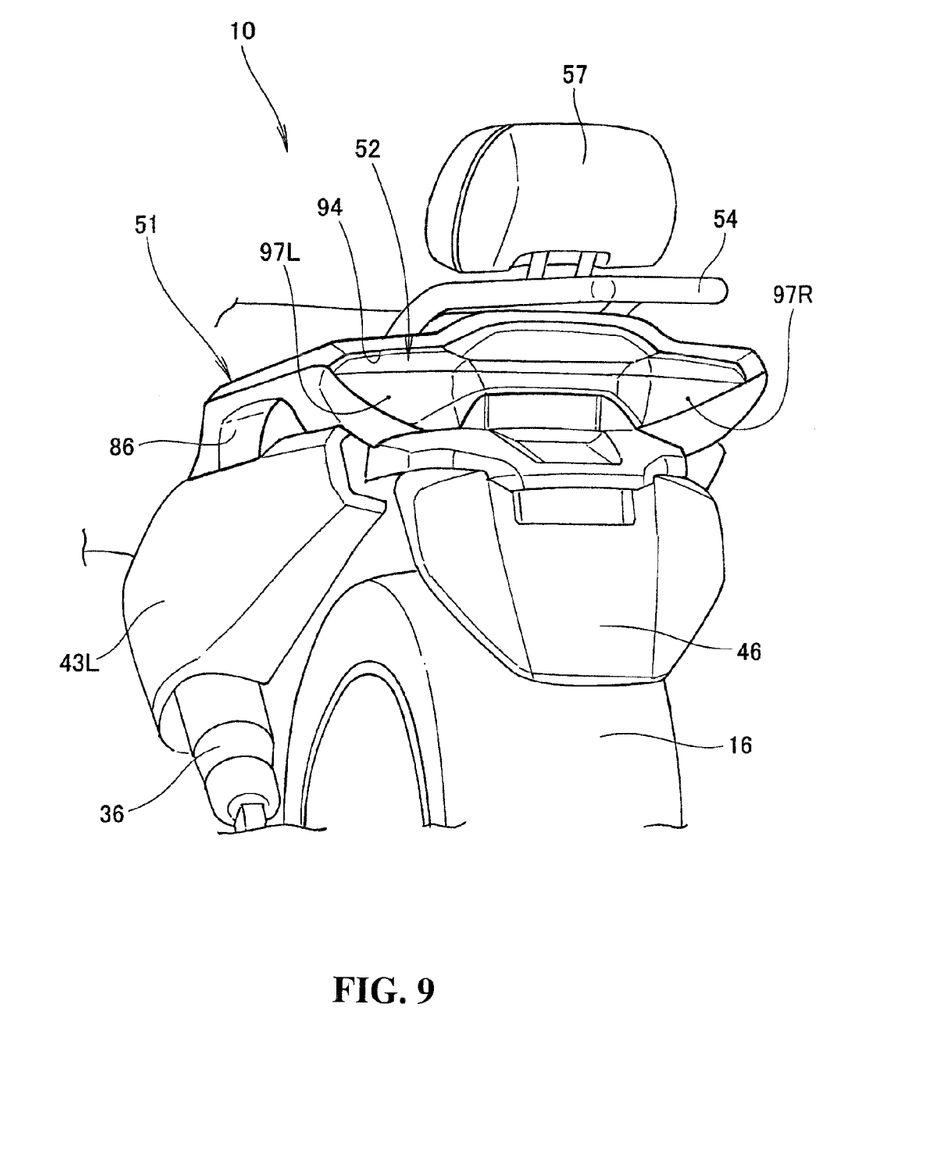
FIG. 9 is a perspective view of a rear portion of the motorcycle.

As shown in FIG. 9, the grab rail 51 has the opening portion 94 opened rearwardly, and the rear lamp assembly 52 is collectively housed in the opening portion 94. The rear lamp assembly 52 is surrounded by the grab rail 51 on the upper side, the left side, and the right side, and is surrounded by the rear mudguard 46 on the lower side. More specifically, the grab rail 51 can be used as a member serving also as a case body for the rear lamp assembly 52. Thus, the case body surrounding the rear lamp assembly 52 can be omitted. When the case body for the rear lamp assembly 52 can be omitted, the rear lamp assembly 52 including the direction indicators 97L and 97R can be reduced in cost.

Referring to FIG. 3 and FIG. 4, the gripping portions 86 extend linearly from the front to the rear. The gripping portions 86 extend linearly without changing in length in the vehicle width direction and thus are easily grasped even blindly. In addition, because the gripping portions 86 extend substantially horizontally in the forward-rearward direction of the vehicle, the rear occupant can grasp the gripping portions 86 at an arbitrary position in the forward-rearward direction of the vehicle. The ease of use of the grab rail 51 is thus further enhanced.

Further, in the case of the gripping portions 86 according to the present invention, as compared with a vehicle whose vehicle body rear portion is decreased in width, the present invention secures a large width for the vehicle body rear portion because the gripping portions 86 extend linearly from the front to the rear. Then, the rear lamp assembly 52 can be increased in width, so that the visibility of the rear lamp assembly 52 can be enhanced.

In FIG. 4, the left and right of the lower plate 73 of the grab rail 51 are separated from each other below the rear lamp assembly 52. As compared with a case where the left and right of the lower plate 73 of the grab rail 51 are integrated with each other, it is easier to omit unnecessary portions when the left and right of the lower plate 73 of the grab rail 51 are formed separately from each other. As a result, the grab rail 51 can be reduced in weight.

In addition, the rear mudguard 46 blocks mud splashed up by the rear wheel 16, thus eliminating a fear of the mud flying onto the rear lamp assembly 52, and the rear mudguard 46 is in contact with the rear lamp assembly 52, so that the set position of the rear mudguard 46 can be raised, and a swing space for the rear wheel 16 can be enlarged.

In FIG. 2, an end portion of the upper plate 74 extends from the front end of the lower plate 73 to an obliquely rearward and upward position above the vehicle body attachment portion 85, and then extends substantially horizontally from the vicinity of the front end of the gripping portion 86 to the rear. More specifically, an upper end 74a of the upper plate 74 extends substantially horizontally. Thus, the gripping portion 86 can be disposed close to an upper surface 22a of the rear occupant seat 22 so as to be easily reached by the hand of the occupant. More specifically, the gripping portion 86 of the grab rail extends from the vehicle body attachment portion 85 to an obliquely rearward and upward position to come closer to the passenger, and is thus grasped easily.

In addition, an end portion of the lower plate 73 extends substantially horizontally. More specifically, a lower end 73b of the lower plate 73 extends substantially horizontally. Thus, the vehicle body attachment portion 85 can be disposed close to the vehicle body frame 11 below the tandem seat.

In FIG. 4, the upper plate 74 and the lower plate 73 are coupled to each other at portions where an outer surface 51s of the grab rail 51 changes sharply. Therefore joints 121 of the upper plate 74 and the lower plate 73 can be made inconspicuous.

The gripping portions 86 have the gripping portion lower surfaces 87 extending to the rear of the vehicle. When the grab rail 51 is gripped, the grab rail 51 is grasped such that fingers are placed on the gripping portion lower surfaces 87. Thus, as compared with a case where the grab rail 51 does not have the gripping portion lower surfaces, the grab rail 51 fits the hands well, and the grab rail 51 is grasped easily.

Referring also to FIG. 2, as viewed from the side of the vehicle, the gripping portion lower surface 87 extends from the front portion of the lower plate 73 to an obliquely rearward and upward position. The gripping portion lower surface 87 is formed in a similar shape to that of the upper end portion 74a of the upper plate 74 which upper end portion 74a extends from the front end 75 of the lower plate 73 to an obliquely rearward and upward position. Therefore the external appearance characteristics of the grab rail 51 can be improved.

In FIG. 3 and FIG. 4, the additional pipe 54 supporting the seat back 57 is detachably attached to the vehicle body frame 11. Members such as the seat back and the like can be attached or detached by merely attaching or removing the additional pipe 54 without replacing the grab rail 51 or without making new holes in the grab rail 51. In this case, for vehicles according to specifications without the additional pipe 54, the holes 62 of the grab rail 51 can be closed by caps having a different shape from that of the caps 89 shown in FIG. 3.

Figure 10A:
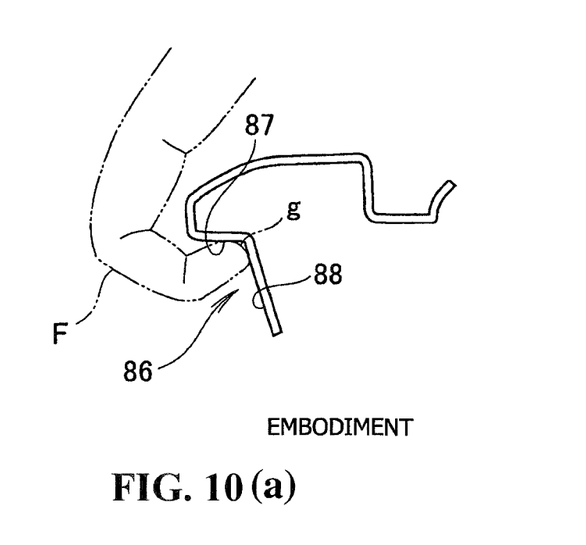
FIGS. 10(a) and 10(b) are diagrams of assistance in explaining the action of gripping portions according to an embodiment and a comparative example.
Figure 10B:
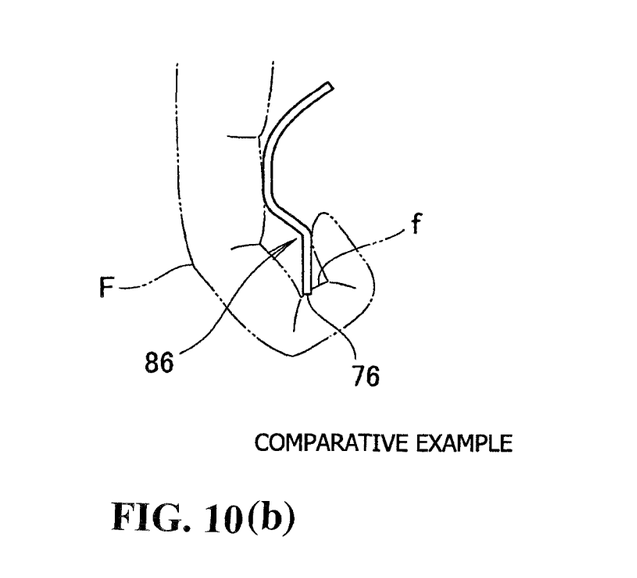

FIG. 10(a) is a diagram of assistance in explaining the action of the gripping portion according to the embodiment. FIG. 10(b) is a diagram of assistance in explaining the action of a gripping portion according to a comparative example.

As shown in the embodiment of FIG. 10(a), the gripping portion 86 has the gripping portion lower surface 87 on which a finger F of the passenger is placed when the passenger grips the gripping portion 86. As shown in the comparative example of FIG. 10(b), in a case of a plate-shaped member whose gripping portion 86 extends downward, there is an advantage in that a finger F is easily hooked under the gripping portion 86, but the gripping portion 86 does not fit the finger F well because the pad f of the finger F is placed against a lower end (end 76) of the gripping portion 86. More specifically, there has been room for improvement in terms of the ease of grasp.

In FIG. 10(a), in the case of the gripping portion 86 having the gripping portion lower surface 87, when the gripping portion 86 is gripped (grasped), the gripping portion 86 is gripped such that the gripping portion lower surface 87 is pressed by a fingertip g. A contact area is increased as compared with the case without the gripping portion lower surface 87, so that the gripping portion 86 can be made easy to grasp.

It is to be noted that while the present invention is applied to a motorcycle in the embodiment, the present invention is also applicable to saddle riding type tricycles and may be applied to ordinary saddle riding type vehicles.

The present invention is suitable for motorcycles provided with a grab rail.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A rear structure of a saddle riding vehicle, the rear structure comprising:
   a vehicle body frame;
   a tandem seat mounted on the vehicle body frame, the tandem seat including a front occupant seat on which a driver is to be seated and a rear occupant seat on which a passenger is to be seated, the front occupant seat and the rear occupant seat being provided integrally with each other a in longitudinal direction;
   a rear cowl covering a side of the vehicle body frame;
   a grab rail disposed on vehicle body sides of the rear occupant seat of the tandem seat above the rear cowl and attached to the vehicle body frame, and grasped by a rear occupant during driving;
   a rear lamp assembly disposed in a rear of the tandem seat so as to face a rear of the vehicle, the rear lamp assembly including a tail lamp, a brake lamp, and direction indicators;
   a rear mudguard disposed under the rear lamp assembly to prevent mud and water splashed up by a rear wheel from being splashed on a vehicle body;
   wherein the grab rail includes a lower plate and an upper plate attached on the lower plate, the grab rail extends to a rear of the rear occupant seat, a left and a right of the grab rail are integrated with each other so as to wrap around the rear of the rear occupant seat, and the grab rail has an opening portion opened to the rear, and the rear lamp assembly is collectively housed in the opening portion, said lower plate includes a vehicle body attachment portion attached to the vehicle body frame and a gripping portion extending from the vehicle body attachment portion to the rear so as to be able to be grasped by the passenger; and
   the gripping portion has a gripping portion lower surface extending with a substantially constant width to a vicinity of the opening portion in a forward-rearward direction of the vehicle, a finger of the passenger being placed against the gripping portion lower surface when the passenger grips the gripping portion.

2. The rear structure of the saddle riding vehicle according to claim 1,
   wherein a left and a right of the lower plate are separated from each other below the rear lamp assembly, and
   the rear mudguard is in contact with a lower surface of the rear lamp assembly.

3. The rear structure of the saddle riding vehicle according to claim 1,
wherein the upper plate and the lower plate project to an outside in a vehicle width direction, and the upper plate and the lower plate are coupled to each other, and
the direction indicators are arranged respectively at a left end portion and a right end portion of the rear lamp assembly.

4. The rear structure of the saddle riding vehicle according to claim 1,
wherein as viewed from a side of the vehicle, an end portion at which the lower plate faces the rear cowl extends substantially horizontally, and
an end portion at which the upper plate faces the rear occupant seat extends from a front end of the lower plate to an obliquely rearward and upward position above the vehicle body attachment portion, and then extends substantially horizontally from a vicinity of a front end of the gripping portion to the rear.

5. The rear structure of the saddle riding vehicle according to claim 1,
wherein the gripping portion has a gripping portion vertical surface extending downward from an inner end portion in a vehicle width direction of the gripping portion lower surface in addition to the gripping portion lower surface, and
as viewed from a side of the vehicle, the gripping portion lower surface extends from a front portion of the lower plate to an obliquely rearward and upward position, and then extends to the rear substantially horizontally.

6. The rear structure of the saddle riding vehicle according to claim 5,
wherein a hole capable of being closed by a cap is made in the upper plate on an inside of the gripping portion vertical surface, and
an additional pipe extended out from the hole to a position above the upper plate to support a seat back is detachably attached to the vehicle body frame.

7. The rear structure of the saddle riding vehicle according to claim 1,
wherein the rear lamp assembly includes a lens portion, and a central portion in a vehicle width direction of the lens portion projects to the rear of the vehicle as compared with a left end and a right end in the vehicle width direction of the lens portion.

8. A rear structure of a saddle riding vehicle, the rear structure comprising:
a grab rail mounted on a vehicle body frame for grasping by a rear occupant during operation of the vehicle;
a rear lamp assembly mounted on a rear portion of a tandem seat so as to face a rear direction of the vehicle, the rear lamp assembly including a tail lamp, a brake lamp, and direction indicators;
said grab rail including a lower plate and an upper plate attached on the lower plate, the grab rail extending to a rear of the rear occupant seat, a left and a right of the grab rail are integrated with each other so as to wrap around the rear of the rear occupant seat, and the grab rail has an opening portion opened to the rear, and the rear lamp assembly is collectively housed in the opening portion;
wherein the lower plate includes a vehicle body attachment portion attached to the vehicle body frame and a gripping portion extending from the vehicle body attachment portion to the rear so as to be able to be grasped by the passenger, and
the gripping portion has a gripping portion lower surface extending with a substantially constant width to a vicinity of the opening portion in a forward-rearward direction of the vehicle, a finger of the passenger being placed against the gripping portion lower surface when the passenger grips the gripping portion.

9. The rear structure of the saddle riding vehicle according to claim 8,
wherein a left and a right of the lower plate are separated from each other below the rear lamp assembly, and
a rear mudguard is in contact with a lower surface of the rear lamp assembly.

10. A rear structure of a saddle riding vehicle, the rear structure comprising:
a vehicle body frame;
a tandem seat mounted on the vehicle body frame, the tandem seat including a front occupant seat on which a driver is to be seated and a rear occupant seat on which a passenger is to be seated, the front occupant seat and the rear occupant seat being provided integrally with each other a in longitudinal direction;
a rear cowl covering a side of the vehicle body frame;
a grab rail disposed on vehicle body sides of the rear occupant seat of the tandem seat above the rear cowl and attached to the vehicle body frame, and grasped by a rear occupant during driving;
a rear lamp assembly disposed in a rear of the tandem seat so as to face a rear of the vehicle, the rear lamp assembly including a tail lamp, a brake lamp, and direction indicators, said direction indicators being arranged respectively at a left end portion and a right end portion of the rear lamp assembly;
a rear mudguard disposed under the rear lamp assembly to prevent mud and water splashed up by a rear wheel from being splashed on a vehicle body;
wherein the grab rail includes a lower plate and an upper plate attached on the lower plate, the grab rail extends to a rear of the rear occupant seat, a left and a right of the grab rail are integrated with each other so as to wrap around the rear of the rear occupant seat, and the grab rail has an opening portion opened to the rear, and the rear lamp assembly is collectively housed in the opening portion, said upper plate and the lower plate projecting to an outside in a vehicle width direction, said upper plate and the lower plate being coupled to each other;
wherein as viewed from a side of the vehicle, an end portion at which the lower plate faces the rear cowl extends substantially horizontally; and
an end portion at which the upper plate faces the rear occupant seat extends from a front end of the lower plate to an obliquely rearward and upward position above the vehicle body attachment portion, and then extends substantially horizontally from a vicinity of a front end of the gripping portion to the rear.

* * * * *